(12) United States Patent
Park

(10) Patent No.: US 9,811,123 B2
(45) Date of Patent: Nov. 7, 2017

(54) BIAXIAL HINGE AND ELECTRONIC DEVICE HAVING THE SAME

(71) Applicant: Samsung Electronics Co., Ltd, Gyeonggi-do (KR)

(72) Inventor: Ji Hoon Park, Gyeonggi-do (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 103 days.

(21) Appl. No.: 14/814,406

(22) Filed: Jul. 30, 2015

(65) Prior Publication Data
US 2016/0034004 A1   Feb. 4, 2016

(30) Foreign Application Priority Data
Jul. 30, 2014   (KR) .......................... 10-2014-0097382

(51) Int. Cl.
| | | |
|---|---|---|
| G06F 1/16 | (2006.01) | |
| E05D 3/12 | (2006.01) | |
| E05D 11/08 | (2006.01) | |
| E05D 11/10 | (2006.01) | |

(52) U.S. Cl.
CPC .............. *G06F 1/1681* (2013.01); *E05D 3/12* (2013.01); *E05D 11/082* (2013.01); *E05D 11/1078* (2013.01); *E05D 2011/085* (2013.01); *E05D 2011/1035* (2013.01); *E05Y 2900/606* (2013.01); *Y10T 16/547* (2015.01)

(58) Field of Classification Search
CPC .... G06F 1/1681; G06F 1/1616; G06F 1/1618; E05D 3/12; E05D 11/082; E05D 11/1078; E05D 2011/085; E05D 2011/1035; E05Y 2900/606; H04M 1/0222; H05K 5/0226; Y10T 16/547; Y10T 16/540225; Y10T 16/5387; Y10T 16/54035
USPC ............. 16/366, 330, 303, 341; 379/433.13; 455/575.3; 361/679.27, 679.06
See application file for complete search history.

(56) References Cited

U.S. PATENT DOCUMENTS

| | | | |
|---|---|---|---|
| 8,627,546 B2 * | 1/2014 | Zhang .................... | G06F 1/1681 16/366 |
| 9,009,919 B1 * | 4/2015 | Chiang ................. | G06F 1/1681 16/303 |
| 9,104,381 B2 * | 8/2015 | Kuramochi ........... | G06F 1/1681 |

(Continued)

FOREIGN PATENT DOCUMENTS

| | | | |
|---|---|---|---|
| JP | 2012237392 A | * | 12/2012 |
| JP | 2013076415 A | | 4/2013 |
| KR | 1020050039419 A | | 4/2005 |

*Primary Examiner* — William Miller

(57) ABSTRACT

A biaxial hinge is provided which includes a rotation cam part including a first rotation cam part and a second rotation cam part configured to rotate with hinge shafts as the center, wherein each of the first and second rotation cam parts include a plurality of pockets each of which comprises one side opened and is inwardly recessed, a sliding cam part comprising one side protruding in a direction of the rotation cam part and an incline so as to move upward and downward in cooperation with rotation of the rotation cam part and insert in the pocket, a guide part including a through-hole formed at a center portion and which one side of the projected sliding cam part perforates to guide movement of the sliding cam part, and a support part configured to support the sliding cam part at a lower portion of the sliding cam part.

20 Claims, 12 Drawing Sheets

(56) References Cited

U.S. PATENT DOCUMENTS

2015/0227175 A1* 8/2015 Motosugi ............. G06F 1/1681
16/341
2016/0102487 A1* 4/2016 Kuramochi ............... E05D 3/12
361/679.27

* cited by examiner

BIAXIAL HINGE AND ELECTRONIC DEVICE HAVING THE SAME

CROSS-REFERENCE TO RELATED APPLICATION AND CLAIM OF PRIORITY

The present application is related to and claims benefit under 35 U.S.C. §119(a) of a Korean patent application filed on Jul. 30, 2014 in the Korean Intellectual Property Office and assigned Serial number 10-2014-0097382, the entire disclosure of which is hereby incorporated by reference.

TECHNICAL FIELD

The present disclosure relates to a biaxial hinge and an electronic device having the same.

BACKGROUND

In order to open and close a display part and a body part of an electronic device such as a notebook computer, a biaxial hinge may be used to open and close a display and a main body by inserting hinge shafts therein and rotatably connecting the hinge shafts.

To rotate a first hinge shaft and a second hinge shaft respectively inserted in a display part and a body part in conjunction with each other, a conventional biaxial hinge rotatably connects the first hinge shaft and the second hinge shaft using a gear.

In the case where a distance between a first hinge shaft and a second hinge shaft, that is, a distance between shafts is great, the size of the gear for connecting the first hinge shaft and the second hinge shaft also becomes large, thereby increasing a thickness of a hinge.

An increase in a distance between shafts and an increase in a thickness of a hinge restricts a product design on an electronic device in which opening and closing are made using a biaxial hinge.

SUMMARY

Aspects of the present disclosure are to address at least the above-mentioned problems and/or disadvantages and to provide at least the advantages described below. To address the above-discussed deficiencies, it is a primary object to provide a biaxial hinge free from restricting a thickness of a hinge due to a distance between shafts.

In accordance with various embodiments of the present disclosure, a biaxial hinge is provided that includes a rotation cam part, a sliding cam part, a guide part, and a support part. The rotation cam part includes a first rotation cam part and a second rotation cam part provided to rotate with hinge shafts as the center, each of the first and second rotation cam parts including a plurality of pockets each of which has one side opened and is inwardly recessed. The sliding cam part includes one side protruding in a direction of the rotation cam part and an incline to move upward and downward in cooperation with the rotation of the rotation cam part and inserted in the pocket. The guide part includes a through-hole formed at a center portion thereof and one side of the projected sliding cam part perforates to guide movement of the sliding cam part. The support part supports the sliding cam part at a lower portion of the sliding cam part.

In accordance with various embodiments of the present disclosure, an electronic device is provided that includes a first housing, a second housing facing the first housing, and a biaxial hinge according to various embodiments of the present disclosure connecting the first housing and the second housing.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, it should be noted that like reference numbers are used to depict the same or similar elements, features, and structures.

DETAILED DESCRIPTION

Figure 1:
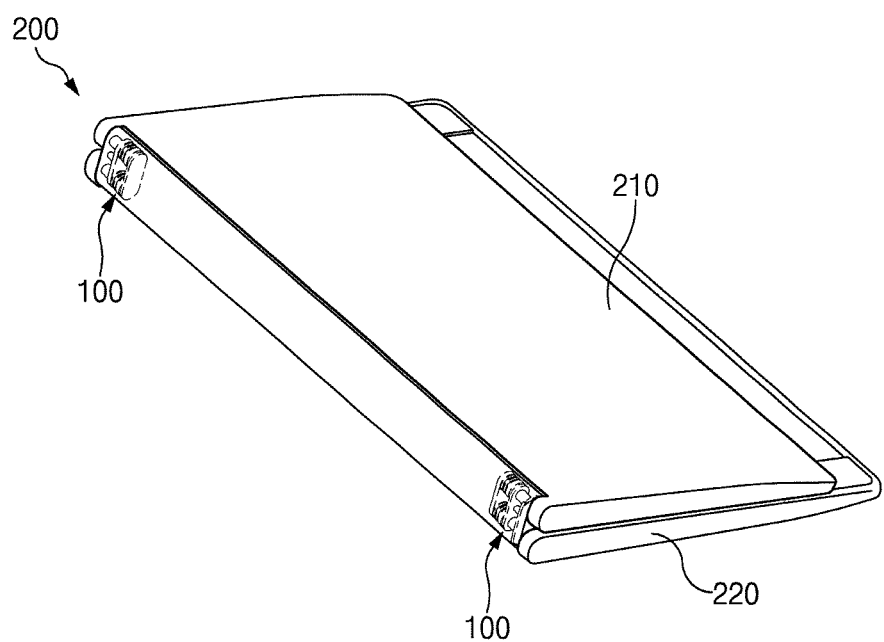
FIG. 1 illustrates an electronic device to which a biaxial hinge according to various embodiments of the present disclosure is applied.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication device. The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions are omitted for clarity and conciseness.

The term "include," "comprise," "including," or "comprising" used herein indicates disclosed functions, operations, or existence of elements but does not exclude other functions, operations or elements. It should be further understood that the term "include", "comprise", "have", "including", "comprising", or "having" used herein specifies the presence of stated features, integers, operations, elements, components, or combinations thereof but does not preclude the presence or addition of one or more other features, integers, operations, elements, components, or combinations thereof.

The meaning of the term "or" or "at least one of A and/or B" used herein includes any combination of words listed together with the term. For example, the expression "A or B" or "at least one of A and/or B" may indicate A, B, or both A and B.

The terms, such as "first," "second," and the like used herein refers to various elements of various embodiments of the present disclosure, but do not limit the elements. For example, such terms do not limit the order and/or priority of the elements. Furthermore, such terms is used to distinguish one element from another element. For example, "a first user device" and "a second user device" indicate different user devices. For example, without departing the scope of the present disclosure, a first element is referred to as a second element, and similarly, a second element is referred to as a first element.

In the description below, when one part (or element, device, etc.) is referred to as being "connected" to another part (or element, device, etc.), it should be understood that the former can be "directly connected" to the latter, or "electrically connected" to the latter via an intervening part (or element, device, etc.). It will be further understood that when one component is referred to as being "directly connected" or "directly linked" to another component, it means that no intervening component is present.

Terms used in this specification are used to describe embodiments of the present disclosure and are not intended to limit the scope of the present disclosure. The terms of a singular form includes plural forms unless otherwise specified.

Unless otherwise defined herein, all the terms used herein, which include technical or scientific terms, have the same meaning that is generally understood by a person skilled in the art. It will be further understood that terms, which are defined in a dictionary and commonly used, should also be interpreted as is customary in the relevant related art and not in an idealized or overly formal sense unless expressly so defined herein in various embodiments of the present disclosure.

Electronic devices according to various embodiments of the present disclosure include a metal case. For example, the electronic devices include at least one of smartphones, tablet personal computers (PCs), mobile phones, video telephones, electronic book readers, desktop PCs, laptop PCs, netbook computers, personal digital assistants (PDAs), portable multimedia players (PMPs), Motion Picture Experts Group (MPEG-1 or MPEG-2) Audio Layer 3 (MP3) players, mobile medical devices, cameras, wearable devices (e.g., head-mounted-devices (HMDs), such as electronic glasses), an electronic apparel, electronic bracelets, electronic necklaces, electronic accessories, electronic tattoos, smart watches, and the like.

According to various embodiments of the present disclosure, the electronic devices are smart home appliances including metal cases. The smart home appliances include at least one of, for example, televisions (TVs), digital versatile disc (DVD) players, audios, refrigerators, air conditioners, cleaners, ovens, microwave ovens, washing machines, air cleaners, set-top boxes, TV boxes (e.g., SAMSUNG HOMESYNC, APPLE TV®, or GOOGLE TV®), game consoles, electronic dictionaries, electronic keys, camcorders, electronic picture frames, and the like.

According to various embodiments of the present disclosure, the electronic devices include at least one of medical devices (e.g., a magnetic resonance angiography (MRA), a magnetic resonance imaging (MRI), a computed tomography (CT), scanners, and ultrasonic devices), navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), and points of sales (POSs).

According to various embodiments of the present disclosure, the electronic devices include at least one of parts of furniture or buildings/structures having communication functions, electronic boards, electronic signature receiving devices, projectors, and measuring instruments (e.g., water meters, electricity meters, gas meters, and wave meters) including metal cases. The electronic devices according to various embodiments of the present disclosure are one or more combinations of the above-mentioned devices. Furthermore, the electronic devices according to various embodiments of the present disclosure are flexible devices. It would be obvious to those skilled in the art that the electronic devices according to various embodiments of the present disclosure are not limited to the above-mentioned devices.

Below, a biaxial hinge according to various embodiments of the present disclosure will be more fully described with reference to accompanying drawings.

Figure 2:
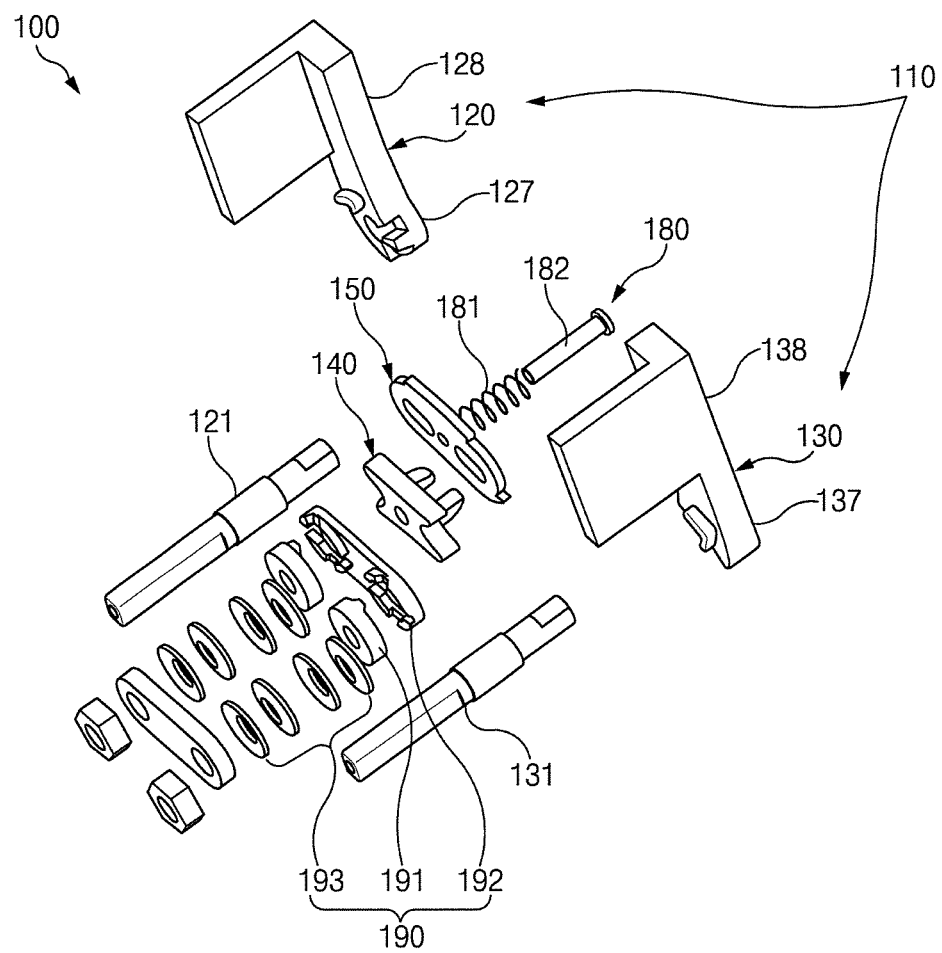
FIG. 2 illustrates an exploded perspective view of a biaxial hinge according to various embodiments of the present disclosure.

Referring to FIGS. 1 and 2, a biaxial hinge 100 according to various embodiments of the present disclosure includes a rotation cam part 110 including a first rotation cam part 120 and a second rotation cam part 130 provided to rotate with hinge shafts 121 and 131 as the center and each including a pocket formed therein, a sliding cam part 140 including an incline formed at an inner side thereof so as to move upwards and downwards in cooperation with rotation of the rotation cam part 110, a guide part 150 guiding movement of the sliding cam part 140, and a support part 180 supporting the sliding cam part 140.

Figure 3:
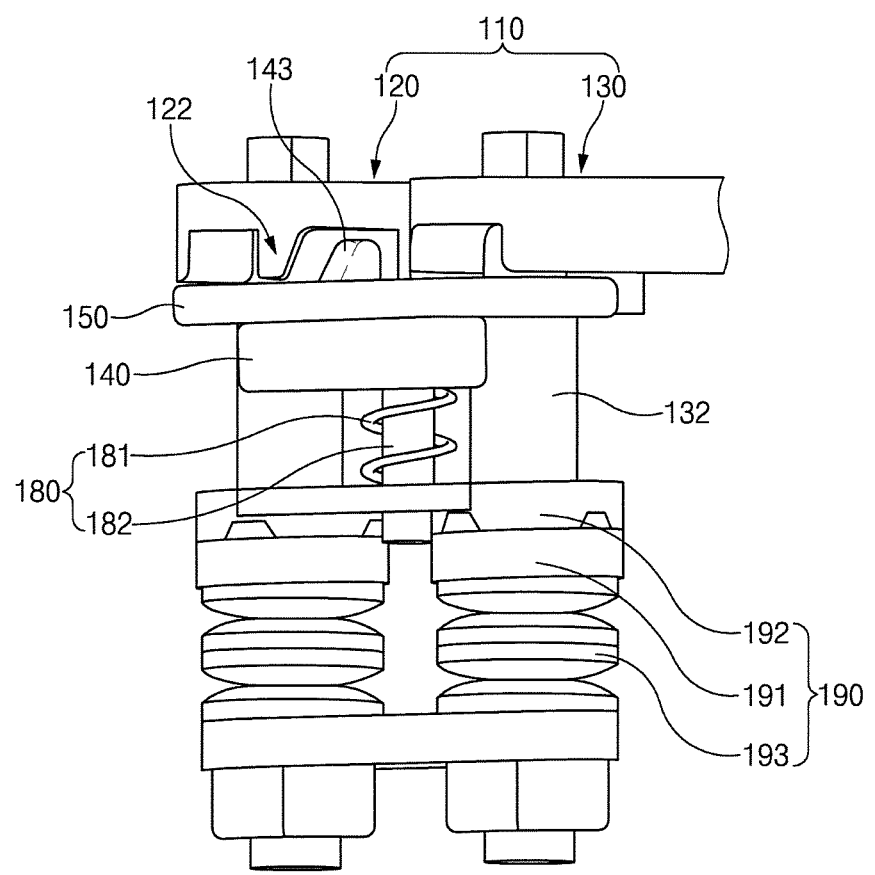
FIG. 3 illustrates a biaxial hinge according to various embodiments of the present disclosure.

Referring to FIG. 3, a pocket is formed at a lower portion of the first rotation cam part 120 and includes a groove shape of which the one side is opened and is inwardly recessed. For example, a height of the pocket is smaller than a thickness of the first rotation cam part 120, and the pocket is provided not to penetrate the rotation cam part 110 and to be inwardly recessed at the lower portion of the first rotation cam part 120.

Figure 4A:
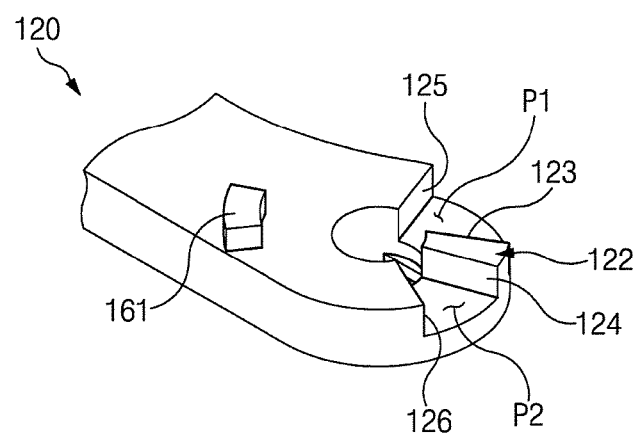
FIG. 4A illustrates a first rotation cam part according to various embodiments of the present disclosure.

Referring to FIG. 4A, the pocket formed at the first rotation cam part 120 according to various embodiments of the present disclosure includes a first pocket P1 and a second pocket P2. The first pocket P1 and the second pocket P2 are separated from each other by a first incline part 122.

In the first rotation cam part 120, according to various embodiments of the present disclosure, the first pocket P1, the first incline part 122, and the second pocket P2 are sequentially arranged clockwise with the first hinge shaft 121, inserted in the first rotation cam part 120, as the center.

Figure 4B:
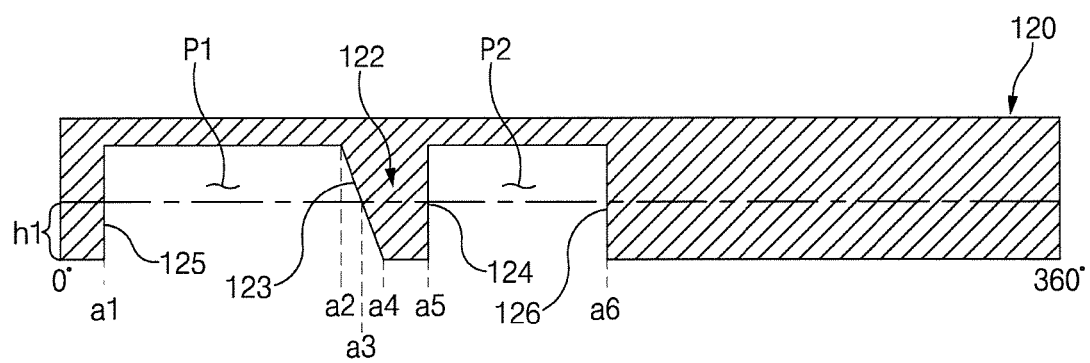
FIG. 4B illustrates a first rotation cam part according to various embodiments of the present disclosure.

Referring to FIG. 4B, a size of the first pocket P1, according to various embodiments of the present disclosure, is larger than that of the second pocket P2.

For example, at a height h1 from an axis direction of the first hinge shaft 121, a cross-sectional area of the first pocket P1 is wider than that of the second pocket P2.

At the height h1 of the first rotation cam part 120, the cross-sectional area of the first pocket P1 is proportional to a distance between a1 and a3, and the cross-sectional area of the second pocket P2 is proportional to a distance between a5 and a6.

According to various embodiments of the present disclosure, since the distance between a1 and a3 is longer than that between a5 and a6, the cross-sectional area of the first pocket P1 is wider than that of the second pocket P2

Furthermore, a volume of the first pocket P1 is greater than that of the second pocket P2.

In FIG. 4A, the first incline part 122, according to various embodiments of the present disclosure, includes a first incline 123 that is inclined into one side between a2 and a4. The first incline 123 is formed in a direction corresponding to that of a third incline 144 formed at a first sliding cam 143 inserted in the first pocket P1, which will be described later.

Accordingly, the first incline 123 formed at the first incline part 122 and the third incline 144 formed at the first sliding cam 143 contact each other to form a cam structure.

Furthermore, a surface of the first incline 122 contacting with the second pocket P2 at a5 form a first vertical surface 124 in a direction parallel with the first hinge shaft 121 (e.g., a vertical direction in the figure).

One side of the first pocket P1, according to various embodiments of the present disclosure, forms the first incline 123, and the other side 125 thereof formed at a1 is formed in an axis direction of the first hinge shaft 121 (e.g., a vertical direction in the figure).

One side of the second pocket P2, according to various embodiments of the present disclosure, forms the first vertical surface 124 at a5, and the other side 126 thereof formed at a6 is formed in an axis direction of the first hinge shaft 121 (e.g., a vertical direction in the figure).

Referring to FIG. 4B, according to various embodiments of the present disclosure, the first rotation cam part 110 includes a second rotation cam part 130 at a position corresponding to that of the first rotation cam part 110. A pocket is formed at a lower portion of the second rotation cam part 130 and includes a groove shape of which one side is opened and that is inwardly recessed.

The second rotation cam part 130 according to various embodiments of the present disclosure includes a third pocket P3 and a fourth pocket P4. The third pocket P3 and the fourth pocket P4 are separated from each other by a second incline part 132.

Figure 5A:
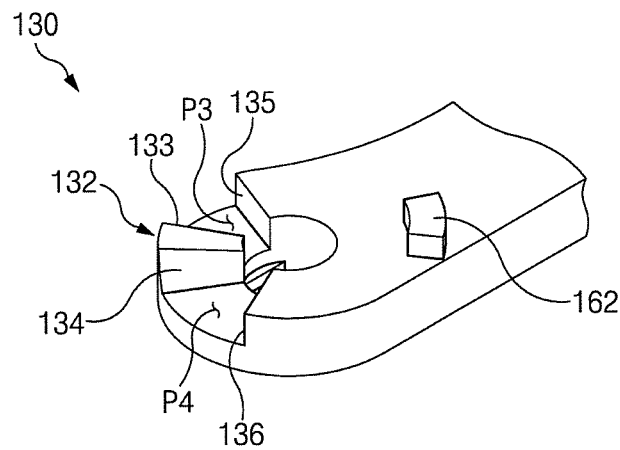
FIG. 5A illustrates a second rotation cam part according to various embodiments of the present disclosure.

Referring to FIG. 5A, in the second rotation cam part 130 according to various embodiments of the present disclosure, the third pocket P3, the second incline part 132, and the fourth pocket P4 are sequentially arranged counterclockwise with the second hinge shaft 131, inserted in the second rotation cam part 130, as the center.

Figure 5B:
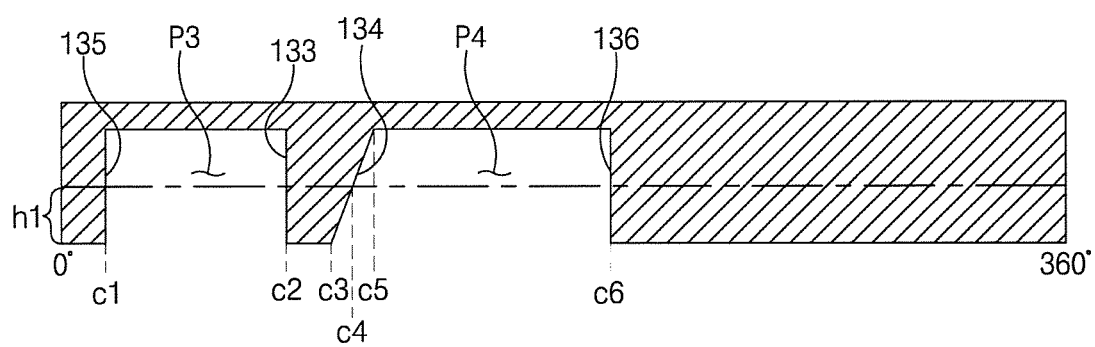
FIG. 5B illustrates a second rotation cam part according to various embodiments of the present disclosure.

According to various embodiments of the present disclosure, as illustrated in FIG. 5B, a size of the third pocket P3 is larger than that of the fourth pocket P4.

For example, at a height h1 from an axis direction of the second hinge shaft 131, a cross-sectional area of the third pocket P3 is narrower than that of the fourth pocket P4.

According to various embodiments of the present disclosure, at the height h1 of the second rotation cam part 130, the cross-sectional area of the third pocket P3 is proportional to a distance between c1 and c2, and the cross-sectional area of the fourth pocket P4 is proportional to a distance between c4 and c6.

According to various embodiments of the present disclosure, since the distance between c1 and c2 is shorter than that between c4 and c6, the cross-sectional area of the third pocket P3 is narrower than that of the fourth pocket P4.

Furthermore, a volume of the third pocket P3 is greater than that of the fourth pocket P4.

Referring to FIG. 5B, the second incline part 132, according to various embodiments of the present disclosure, includes a second incline 134 that is inclined into one side between c3 and c5. The second incline 134 is formed in a direction corresponding to that of a fourth incline 147 formed at a second sliding cam 146, described with respect to FIG. 6, inserted in the fourth pocket P4.

Accordingly, the second incline 134, formed on the second incline part 132, and the fourth incline 147, formed proximate to where the second sliding cam 146 inserts, contact each other to form a cam structure.

Furthermore, a second vertical surface 133 is formed at one side of the second incline part 132 in an axis direction of the second hinge shaft 131 (e.g., a vertical direction in the figure).

According to various embodiments of the present disclosure, one side of the third pocket P3 forms the second vertical surface 133 at c2, and the other side 135 thereof formed at c1 is formed in an axis direction of the second hinge shaft 131 (e.g., a vertical direction in the figure).

According to various embodiments of the present disclosure, as described above, the fourth pocket P4 includes the second incline 134 between c3 and c5, and the other side thereof formed at c6 is formed in an axis direction of the second hinge shaft 131 (e.g., a vertical direction in the figure).

In the rotation cam part 110, according to various embodiments of the present disclosure, the first incline 123 and the second incline 134 are formed to be inclined in opposite directions to each other. For example, referring to FIG. 4B, the first incline 123 of the first rotation cam part 120 according to various embodiments of the present disclosure is provided to be inclined from the top to the bottom. Referring to FIG. 5B, the second incline 134 is provided to be inclined from the bottom to the top.

In the rotation cam part 110, according to various embodiments of the present disclosure, furthermore, the first pocket P1 of the first rotation cam part 120 and the fourth pocket P4 of the second rotation cam part 130 are provided to have the same shape, and the second pocket P2 of the first rotation cam part 120 and the third pocket P3 of the second rotation cam part 130 are provided to have the same shape.

Figure 6:
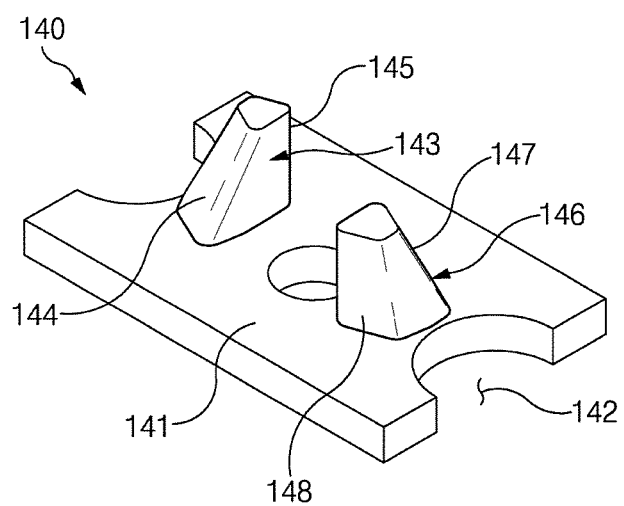
FIG. 6 illustrates a sliding cam part according to various embodiments of the present disclosure.
Figure 7A:
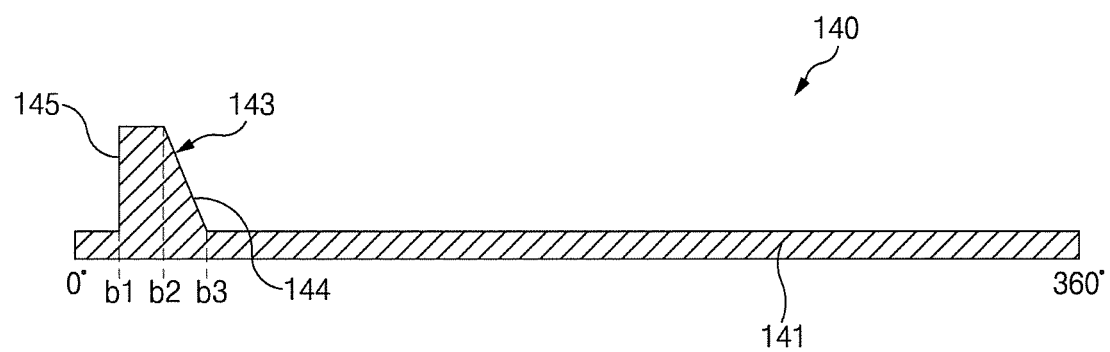
FIG. 7A illustrates a first sliding cam part according to various embodiments of the present disclosure.
Figure 7B:
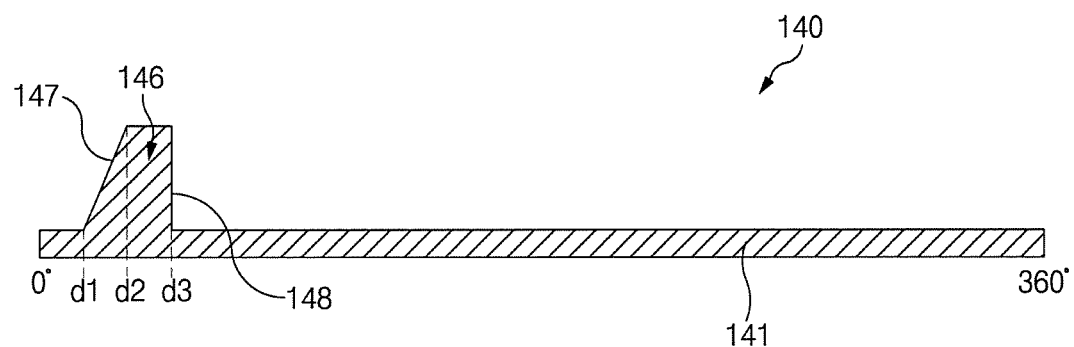
FIG. 7B illustrates a second sliding cam according to various embodiments of the present disclosure.

Referring to FIGS. 6, 7A and 7B, the sliding cam part 140, according to various embodiments of the present disclosure, includes a sliding cam body 141 placed at a lower portion of the rotation cam part 110, and a first sliding cam 143 and a second sliding cam 146 protruding from the sliding cam body 141 and spaced apart from each other.

Referring to FIGS. 6 and 7A, the first sliding cam 143 according to various embodiments of the present disclosure includes a third incline 144 protruding from the sliding cam body 141 in a direction of the rotation cam part 110. According to various embodiments of the present disclosure, the first sliding cam 143 includes the third incline 144 between b2 and b3 and a third vertical surface 145 formed at b1 in a direction of the first hinge shaft 121.

Referring to FIGS. 6 and 7B, the second sliding cam 146 according to various embodiments of the present disclosure includes a fourth incline 147 protruding from the sliding cam body 141 in a direction of the rotation cam part 110. Furthermore, the second sliding cam 146 is spaced apart from the first sliding cam 143 by a constant distance in a transverse direction of the sliding cam body 141. According to various embodiments of the present disclosure, the second sliding cam 146 includes the fourth incline 147 between d1 and d2 and a third vertical surface 145 formed at d4 in a direction of the first hinge shaft 121.

The first sliding cam 143 and the second sliding cam 146, according to various embodiments of the present disclosure, are formed such that the third incline 144 and the fourth incline 147 are inclined in opposite directions, respectively.

In the rotation cam part 110 and the sliding cam part 140, according to various embodiments of the present disclosure, the first incline 123 corresponds to the third incline 144, and the second incline 134 corresponds to the fourth incline 147. Furthermore, the first incline 123 and the second incline 134 is formed to be inclined in different directions, and the third incline 144 and the fourth incline 147 is formed to be inclined in different directions.

In FIGS. 7A and 7B, the upper surfaces of the first sliding cam 143 and the second sliding cam 146 are illustrated as being a plane, but they can be formed to be curved.

According to various embodiments of the present disclosure, the sliding cam body 141 includes an insertion portion 142 having a shape in which both side surfaces of the sliding cam body 141 are inwardly recessed such that the first hinge shaft 121 and the second hinge shaft 131 are inserted in sides thereof.

Figure 8:
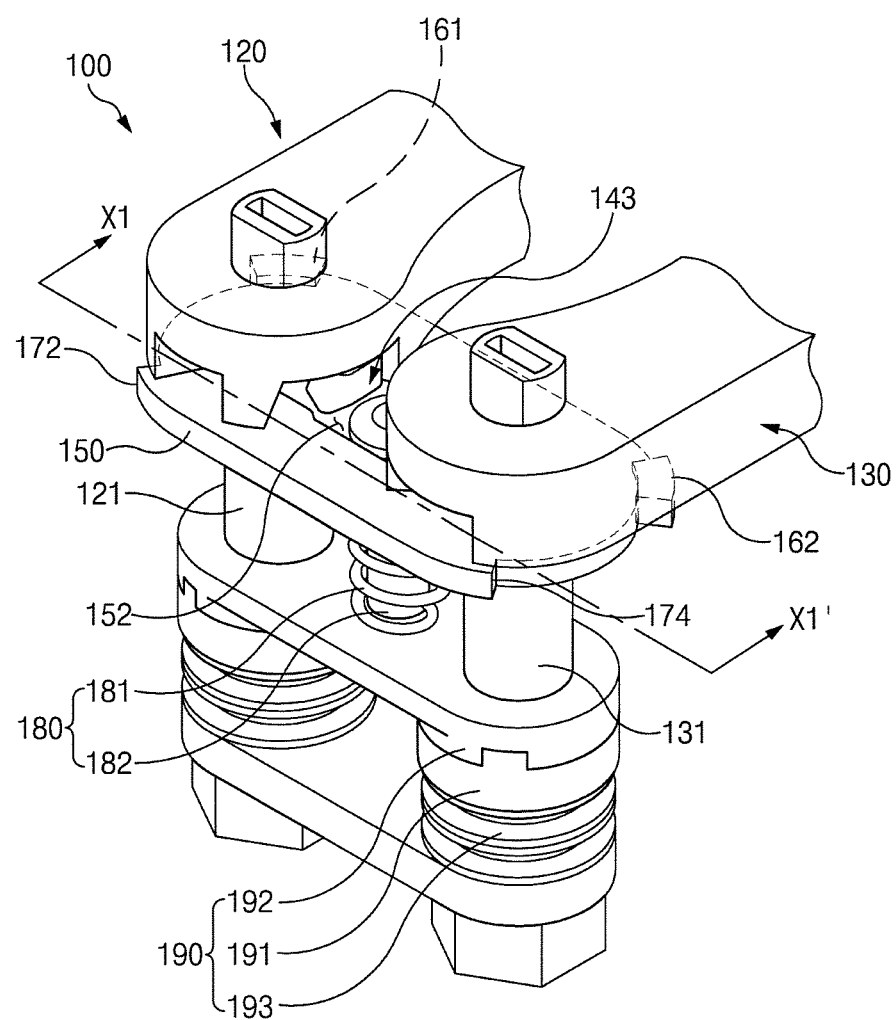
FIG. 8 illustrates a closed state of a biaxial hinge according to various embodiments of the present disclosure.
Figure 9:
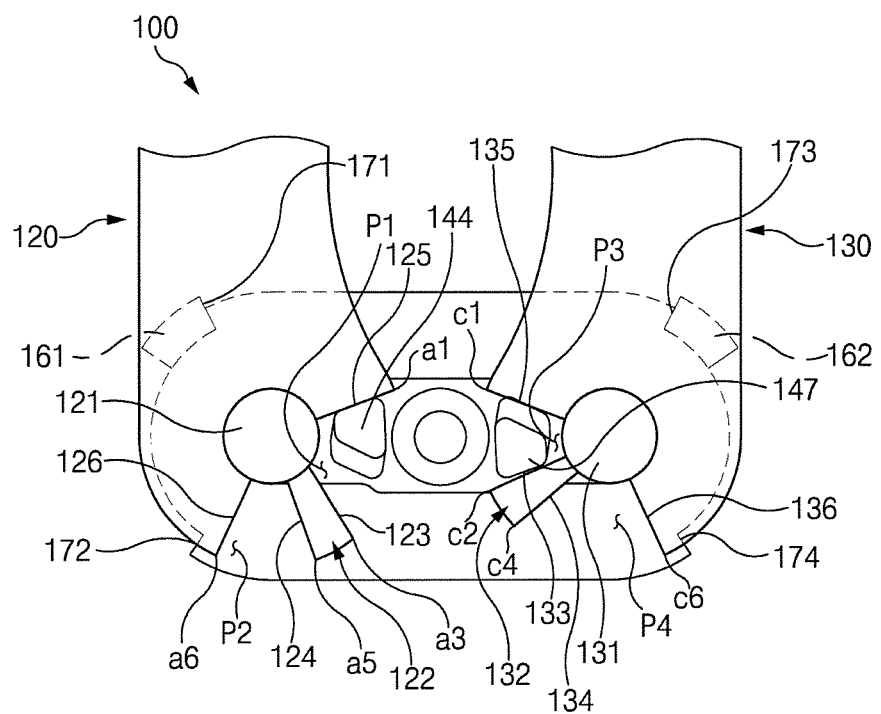
FIG. 9 illustrates a cross-sectional view taken along a line X1-X1' of FIG. 8 according to various embodiments of the present disclosure.

Referring to FIGS. 2, 8, and 9, according to various embodiments of the present disclosure, a through-hole 152 is formed at a center portion of the guide part 150 in a transverse direction to allow the first sliding cam 143 and the second sliding cam 146 to be inserted in a guide body 151.

According to various embodiments of the present disclosure, a body thickness of the guide part 150 is formed to be smaller than a height of each of the first and second sliding cams 143 and 146, to allow the first and second sliding cams 143 and 146 to protrude into the outside of the guide part 150 through the through-hole 152.

The vertical movement of the sliding cam part 140 according to various embodiments of the present disclosure is guided by the guide part 150, thereby preventing the sliding cam part 140 from leaving at movement.

In the guide part 150, a shape of a lower surface of the guide body 151 corresponds to a shape of an upper surface of the sliding cam body 141.

According to various embodiments of the present disclosure, when the first sliding cam 143 and the second sliding cam 146 are inserted in the through-hole 152, the first sliding cam 143 and the second sliding cam 146 protrude to the upper portion of the guide body 151, and a lower surface of the guide body 151 contacts an upper surface of the sliding cam body 141.

In the guide part 150, according to various embodiments of the present disclosure, the first hinge shaft 121 and the second hinge shaft 131 are inserted in the through-hole 152 formed at the guide body 151. For example, referring to FIGS. 8 and 9, the first hinge shaft 121, the first sliding cam 143, the second sliding cam 146, and the second hinge shaft 131 are sequentially inserted in the through-hole 152 from the left to the right in the figure.

Referring to FIGS. 8 and 9, the guide part 150, according to various embodiments of the present disclosure, further includes a holding parts 171-174 each protruding toward one side so as to restrict turning radiuses of the first rotation cam part 120 and the second rotation cam part 130.

When the first rotation cam part 120 rotates toward a direction close to the second rotation cam part 130, the holding parts include a first holding part 171 protruding at one side of the guide body 151 to prevent the first rotation cam part 120 from contacting with the second rotation cam part 130.

Furthermore, when the first rotation cam part 120 rotates toward a direction far away from the second rotation cam part 130, the holding parts further include a second holding part 172 protruding from the guide body 151 at a position spaced apart from the first holding part 171 by a set angle to restrict a rotation angle of the first rotation cam part 120.

The holding parts, according to various embodiments of the present disclosure, further include a third holding portion 173 at a position corresponding to the first holding part 171 to restrict turning radiuses of the second rotation cam part 130 and a fourth holding portion 174 at a position corresponding to the second holding part 172.

Referring to FIGS. 3, 8, and 9, to restrict tuning radiuses of the first and second cam parts 120 and 130 through contacts between one sides of the first and second rotation cam parts 120 and 130 and the first and second holding parts 171 and 172, the first rotation cam part 120 and the third rotation cam part 130 include a protrusion part protruding in a direction of the sliding cam part 140 to allow lower surfaces of the first and second rotation cam parts 120 and 130 to contact with the holding parts.

The protrusion part, according to various embodiments of the present disclosure, includes a first protrusion part 161 provided at the first rotation cam part 120 to restrict the turning radius of the first rotation cam part 120, and a second protrusion part 162 for restricting the turning radius of the second rotation cam part 130.

Accordingly, when the rotation cam part 110 and the sliding cam part 140 are coupled to each other and the first rotation cam part 120 and the second rotation cam part 130 rotate in a direction close to the first rotation cam part 120 and the second rotation cam part 130, one side of the first protrusion part 161 contacts the first holding part 171 to restrict the rotation of the first rotation cam part 120. One side of the second holding part 172 contacts the third holding part 173 to restrict the rotation of the second rotation cam part 130.

According to various embodiments of the present disclosure, when the first rotation cam part 120 and the second rotation cam part 130 rotate in a direction far away from each other, the other side of the first protrusion part 161 and the other side of the second protrusion part 162 respectively contact with the second holding part 172 and the fourth holding part 174, thereby making it possible to restrict the rotation of a first rotation cam 191 and a second rotation cam 193.

Referring to FIGS. 8 and 9, the support part 180, according to various embodiments of the present disclosure, includes an elastic member 181 between a lower portion of the sliding cam part 140 and a lower plate 192 placed under the sliding cam part 140, to allow a restoring force to be provided to the sliding cam part 140.

According to various embodiments of the present disclosure, the elastic member 181 is a spring, and one side of the spring presses a lower portion of the sliding cam part 140, and the other side thereof presses the lower plate 192. Accordingly, in the case where one side of the spring is fastened, the restoring force is provided to the other side thereof by an elastic force.

The support part 180, according to various embodiments of the present disclosure, further includes a support shaft 182 in the spring. The support shaft 182 is inserted in the spring.

According to various embodiments of the present disclosure, one side of the support shaft 182 is inserted and fixed in the sliding cam body 141, and the other side thereof perforates the lower plate 192. Accordingly, when the sliding cam part 140 moves downward, a lower portion of the support shaft 182 moves downward through the lower plate 192 and the sliding cam part 140 again rises by an elastic force of the elastic member 181 surrounding the support shaft 182.

As another embodiment, one side of the support shaft 182 perforates the sliding cam body 141, and the other side thereof is fastened to the lower plate 192.

In certain embodiments, when the sliding cam part 140 moves downward, an upper portion of the support shaft 182 moves downward, with the support shaft 182 penetrating the sliding cam body 141, and the sliding cam part 140 again rises by an elastic force of the elastic member 181 surrounding the support shaft 182.

Referring to FIGS. 8 and 9, the biaxial hinge 100, according to various embodiments of the present disclosure, further includes a second cam part 190 under the sliding cam part 140.

According to various embodiments of the present disclosure, the second cam part 190 includes a rotation cam 191 coupled with the hinge shaft and rotating with the hinge shaft, a third sliding cam 192 moving upward and downward through sliding according to rotation of the rotation cam 191 with the third sliding cam 192 perforated by the hinge shaft, and an elastic part 193 providing a restoring force to the third sliding cam 192.

According to various embodiments of the present disclosure, the third sliding cam 192 is formed of the lower plate 192. For example, the lower plate 192 contacts the support part 180 with a member independent of the third sliding cam 192 and the lower plate 192 is formed of the same member as the third sliding cam 192, thereby forming a cam structure with the rotation cam 191.

The rotation cam 191 and the third sliding cam 192, according to various embodiments of the present disclosure, includes inclines corresponding to a bottom end and a top end; hence, when the rotation cam 191 rotates, the third sliding cam 192 makes a linear motion upward and downward.

According to various embodiments of the present disclosure, furthermore, a plurality of inclines is formed at the rotation cam part 110 and the third sliding cam 192, and a user rotate the hinge axes 121 and 131 by sensing an up-and-down motion of the third sliding cam 190 based on the number of inclines.

The biaxial hinge 100 according to various embodiments of the present disclosure is applied to an electronic device 200.

Referring to FIGS. 1 and 2, in an electronic device (e.g., a notebook computer) including a display part and first and second housings 110 and 220 corresponding to a body part, the biaxial hinge 100, according to various embodiments of the present disclosure, connects the first housing 110 and the second housing 220 at both ends thereof.

According to various embodiments of the present disclosure, the first rotation cam part 120 and the second rotation cam part 130 includes rotation bodies 127 and 137, in which the hinge shafts are inserted and each of which has a pocket formed at a lower portion thereof, and connection bodies 128 and 138 extending from the rotation bodies 127 and 137 respectively.

In certain embodiments, the first housing 110 is coupled to the connection body 128 of the first rotation cam part 120 at both side ends thereof, and the second housing 220 is coupled to the connection body 138 of the second rotation cam part 130 at both side ends thereof. Accordingly, the first housing 110 and the second housing 220 are connected by the biaxial hinge 100 according to various embodiments of the present disclosure.

The first housing 110 and the second housing 220 correspond to the display part and the body part, respectively. However, each of the first housing 110 and the second housing 220 include a display part, but various embodiments are possible.

Below, effects on the biaxial hinge 100 and an electronic device 200 including the same are more fully described with reference to accompanying drawings.

Referring to FIGS. 8 and 9, in the case where the first rotation cam part 120 and the second rotation cam part 130 face each other, for example, in the case where the electronic device 200 to which the biaxial hinge 100, according to various embodiments of the present disclosure, is connected is closed, the first sliding cam 143 is inserted in the first pocket P1, and the second sliding cam 146 is inserted in the third pocket P3.

When an external force is applied to the first rotation cam part 120 or the second rotation cam part 130 to open the electronic device 200 to which the biaxial hinge 100, according to various embodiments of the present disclosure, is connected, the first rotation cam part 120 first rotates because the first sliding cam 143 inserted in the first pocket P1 of which the size is relative large does not contact with the first incline part 122.

When the first rotation cam part 120, according to various embodiments of the present disclosure, continues to rotate, the third incline 144 of the first sliding cam 143 inserted in the first pocket P1 contacts the first incline 123 of the first rotation cam part 120.

When the first rotation cam part 120, according to various embodiments of the present disclosure, continues to rotate, the first incline 123 processes the third incline 144 by the rotation of the first rotation cam part 120, so that the first sliding cam 143 slides and falls.

When a user applies an external force to the first rotation cam part 120 at a state the second incline 133 contacts the fourth vertical surface 148 of the second sliding cam 146, the external force is transferred to the second rotation cam part 130 to thus rotate in a direction far away from the first rotation cam part 120.

Furthermore, since the first sliding cam 143 and the second sliding cam 146 protrude from one sliding cam body 141, the sliding cam body 141 and the second sliding cam 146 protruding from the sliding cam body 141 falls if the first sliding cam 143 falls.

When the first rotation cam part 120 rotates in a direction far away from the second rotation cam part 130 by the external force, the second rotation cam part 130 also rotates in a direction far away from the first rotation cam part 120, and the first sliding cam 146 (or the first sliding cam part 140) and the second sliding cam 146 (or the second sliding cam part 140) fall.

Figure 10:
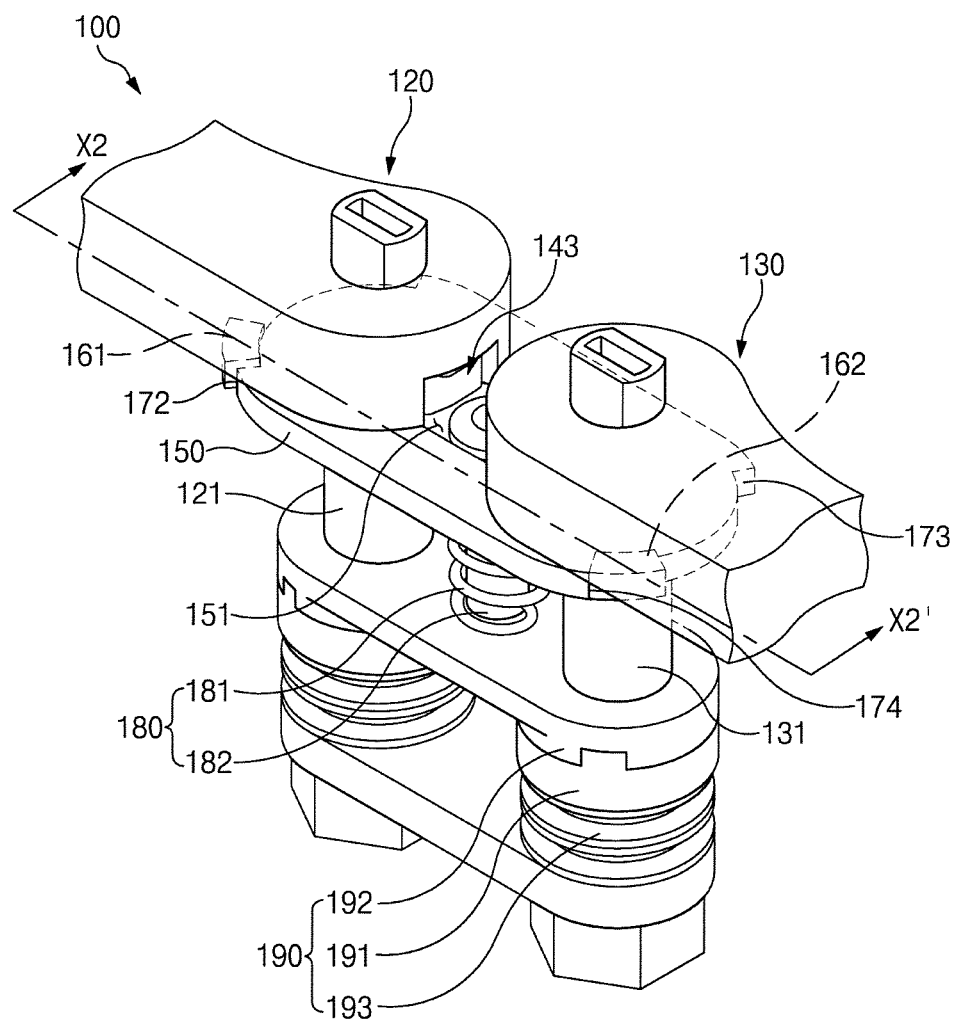
FIG. 10 illustrates an opened state of a biaxial hinge according to various embodiments of the present disclosure.
Figure 11:
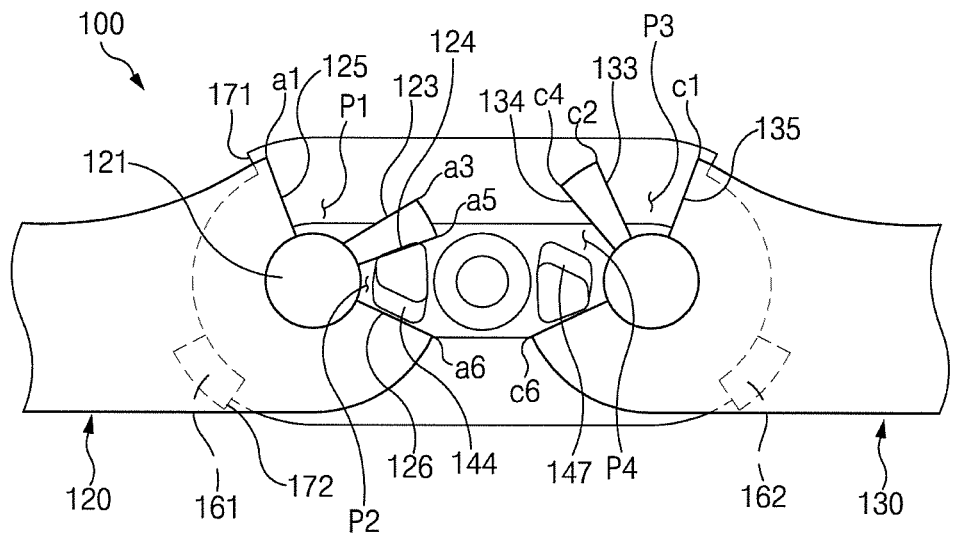
FIG. 11 illustrates a cross-sectional view taken along a line X2-X2' of FIG. 10 according to various embodiments of the present disclosure.

Referring to FIGS. 10 and 11, when the first rotation cam part 120 and the second rotation cam part 130 continue to rotate, the first sliding cam 143 is inserted in the second pocket P2, and the second sliding cam 146 is inserted in the fourth pocket P4.

An elastic force of the support part 180 allows the sliding cam part 140 to rise and the first and second sliding cams 143 and 146 to be inserted in the second and fourth pockets P2 and P4 at a rising state.

When the first rotation cam part 120, according to various embodiments of the present disclosure, continues to rotate, the first protrusion part 161 formed at the first rotation cam part 120 contacts the second holding part 172 so that the movement of the first rotation cam part 120 stops.

When the second rotation cam part 130, according to various embodiments of the present disclosure, continues to rotate, the second protrusion part 162 contacts the fourth holding part 174 so that the movement of the second rotation cam part 130 stops.

Meanwhile, a maxim angle between the first rotation cam part 120 and the second rotation cam part 130 is set by positions of the protrusion parts 161 and 162, the first holding part 172 and the fourth holding part 174. For example, in the case of the electronic device 200 to which the biaxial hinge 100 is coupled, it is possible to set a maximum angle between the first housing 110 and the second housing 220 when opened.

In the case where the first rotation cam part 120 and the second rotation cam part 130 rotate in a direction facing each other at a state where they are maximally spaced apart from each other, for example, in the case where a state of the electronic device 200 including the biaxial hinge 100 transitions from a maximally opened state to a closed state, the above-described components works in an opposite manner as compared with the case that the electronic device 200 is opened.

Referring to FIGS. 10 and 11 illustrating an opened state of the biaxial hinge 100 according to various embodiments of the present disclosure, the first sliding cam 143 is inserted in the second pocket P2 of the first rotation cam part 120, and the second sliding cam 146 is inserted in the fourth pocket P4.

When an external force is applied to rotate the first rotation cam part 120 and the second rotation cam part 130, the second rotation cam part 130 first rotate without contact with the second sliding cam 146. The reason is that the second sliding cam 146 is inserted in the fourth pocket P4.

When the second rotation cam part 130 continues to rotate, the second incline 134 of the second rotation cam part 130 contacts the fourth incline 147 of the second sliding cam 146 and the second incline 134 presses the fourth incline 147, thereby allowing the second sliding cam 146 to fall.

The first sliding cam 143 is inserted in the second pocket P2, and the third vertical surface 145 of the first sliding cam 143 contacts the first vertical surface 124 of the first incline part 122. As described above, when the second sliding cam 146 falls, the first sliding cam 143 also falls.

Referring to FIGS. 8 and 9, if the second rotation cam part 130 continues to rotate, the second sliding cam 146 is inserted in the third pocket P3, and the first sliding cam 143 is inserted.

When the first sliding cam 143 and the second sliding cam 146 are inserted in the pockets, as described above, the sliding cam part 140 rises in a direction of the rotation cam part 110 by an elastic force from the support part 180.

When the first rotation cam part 120 and the second rotation cam part 130 continue to rotate, the other side of the first protrusion part 161 formed at a lower portion of the first rotation cam part 120 contacts the first holding part 171, so that the movement of the first rotation cam part 120 stops. The other side of the second protrusion part 162 provided at the second rotation cam part 130 contacts the third protrusion part 173, so that the rotation of the second rotation cam part 130 stops.

As described above, according to various embodiments of the present disclosure, a maximum neighboring angle between the first rotation cam part 120 and the second rotation cam part 130 is set by determining positions of the protrusion parts 161 and 162 and the holding parts when the first rotation cam part 120 and the second rotation cam part 130 rotate in an approaching direction. For example, in the case of the electronic device 200 to which the biaxial hinge is coupled, it is possible to set a maximum neighboring angle when the first housing 110 and the second housing 220 are opened.

Figure 12:
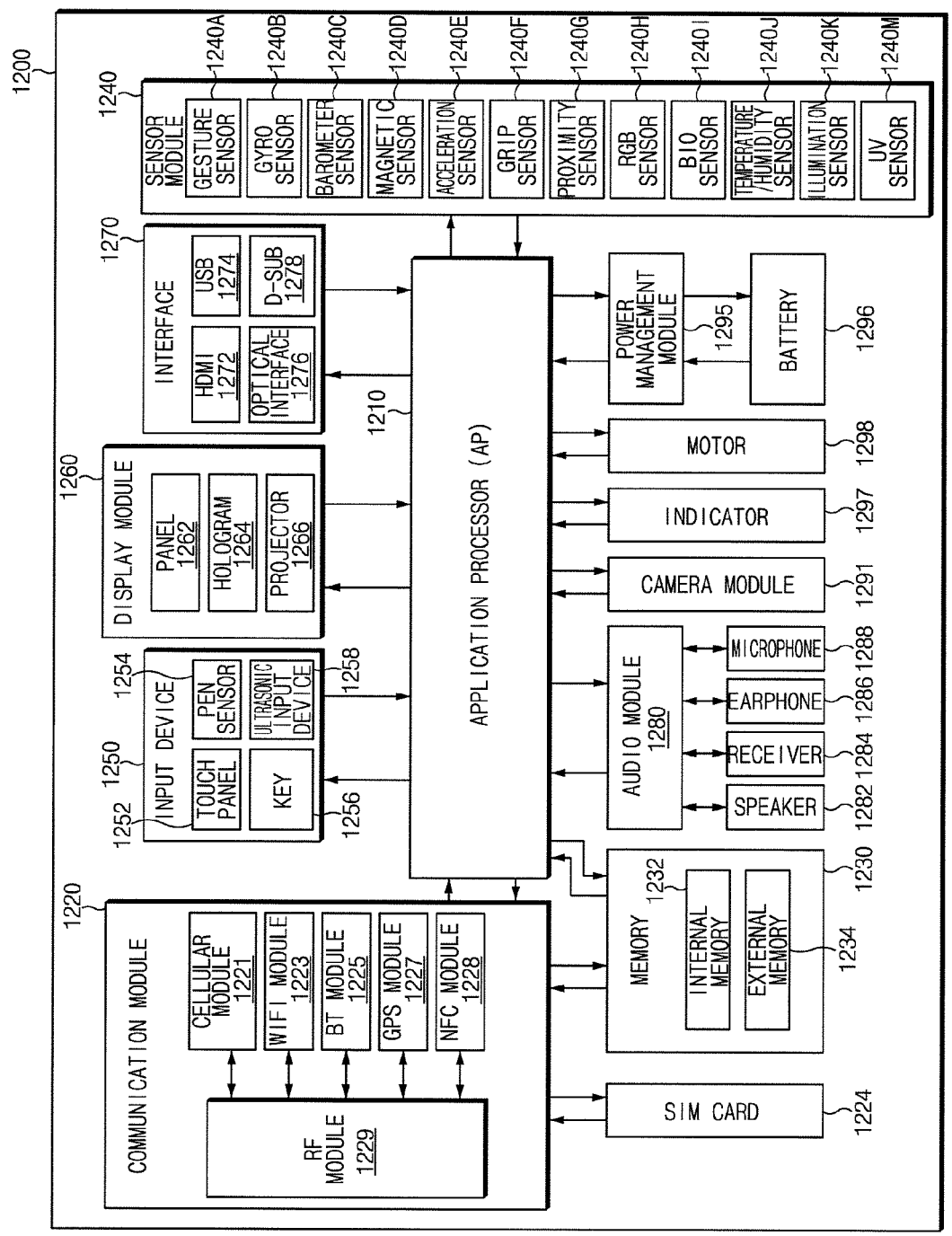
FIG. 12 illustrates an electronic device according to various embodiments of the present disclosure.

FIG. 12 is a block diagram illustrating an electronic device according to various embodiments of the present disclosure. An electronic device 1200 includes, for example, a part or all of components of an electronic device according to various embodiments of the present disclosure. Referring to FIG. 12, the electronic device 1200 includes one or more application processors (AP) 1210, a communication module 1220, a subscriber identification module (SIM) card 1224, a memory 1230, a sensor module 1240, an input device 1250, a display module 1260, an interface 1270, an audio module 1280, a camera module 1291, a power management module 1295, a battery 1296, an indicator 1297, and a motor 1298.

The AP 1210 drives an operating system (OS) or an application to control a plurality of hardware or software components connected to the AP 1210 and processes and computes a variety of data including multimedia data. The AP 1210 is implemented with a System on Chip (SoC), for example. According to various embodiments of the present disclosure, the AP 1210 further includes a graphic processing unit (GPU) (not illustrated).

The communication module 1220 transmits and receives data when there are conveyed communications between other electronic devices connected with the electronic device 1200 through a network. According to various embodiments of the present disclosure, the communication module 1220 includes a cellular module 1221, a wireless-fidelity (Wi-Fi) module 1223, a BLUETOOTH (BT) module 1225, a global positioning system (GPS) module 1227, a near field communication (NFC) module 1228, and a radio frequency (RF) module 1229.

The cellular module 1221 provides voice communication, video communication, a character service, an Internet service, and the like through a communication network (e.g., an LTE, an LTE-A, a CDMA, a WCDMA, a UMTS, a WiBro, a GSM, or the like). Also, the cellular module 1221 performs discrimination and authentication of an electronic device within a communication network using a subscriber identification module (e.g., a SIM card 1224), for example. According to various embodiments of the present disclosure, the cellular module 1221 performs at least a portion of functions that the AP 1210 provides. For example, the cellular module 1221 performs at least a portion of a multimedia control function.

According to various embodiments of the present disclosure, the cellular module 1221 includes a communication processor (CP). Furthermore, the cellular module 1221 is implemented with, for example, a SoC.

According to various embodiments of the present disclosure, the AP 1210 or the cellular module 1221 (e.g., a communication processor) loads and processes an instruction or data received from nonvolatile memories respectively connected thereto or from at least one of other elements at the nonvolatile memory. Also, the AP 1210 or the cellular module 1221 stores data received from at least one of other elements or generated by at least one of other elements at a nonvolatile memory.

Each of the Wi-Fi module 1223, the BT module 1225, the GPS module 1227, and the NFC module 1228 includes a processor for processing data exchanged through a corresponding module, for example.

According to various embodiments of the present disclosure, at least a portion (e.g., two or more components) of the cellular module 1221, the Wi-Fi module 1223, the BT module 1225, the GPS module 1227, and the NFC module 1228 is included within one Integrated Circuit (IC) or an IC package. For example, at least a portion (e.g., a communication processor corresponding to the cellular module 1221 and a Wi-Fi processor corresponding to the Wi-Fi module 1223) of communication processors corresponding to the cellular module 1221, the Wi-Fi module 1223, the BT module 1225, the GPS module 1227, and the NFC module 1228 are implemented with one SoC.

The RF module 1229 transmits and receives data, for example, an RF signal. Although not illustrated, the RF module 1229 includes a transceiver, a power amplifier module (PAM), a frequency filter, or low noise amplifier (LNA). Furthermore, the RF module 1229 further includes the following part for transmitting and receiving an electromagnetic wave in a space in wireless communication: a conductor or a conducting wire.

According to various embodiments of the present disclosure, at least one of the cellular module 1221, the Wi-Fi module 1223, the BT module 1225, the GPS module 1227, or the NFC module 1228 transmits and receives an RF signal through a separate RF module.

The SIM card 1224 is a card that includes a subscriber identification module and is inserted to a slot formed at a specific position of the electronic device 1200. The SIM card 1224 includes unique identify information (e.g., integrated circuit card identifier (ICCID)) or subscriber information (e.g., integrated mobile subscriber identity (IMSI)).

The memory 1230 includes an embedded memory 1232 or an external memory 1234. For example, the embedded memory 1232 includes at least one of a volatile memory (e.g., dynamic RAM (DRAM), static RAM (SRAM), synchronous dynamic RAM (SDRAM), etc.), or a nonvolatile memory (e.g., a dynamic random access memory (DRAM), a static RAM (SRAM), or a synchronous DRAM (SDRAM)) and a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, or a NOR flash memory).

According to various embodiments of the present disclosure, the embedded memory 1232 is a solid state drive (SSD). The external memory 1234 includes a flash drive, for example, compact flash (CF), secure digital (SD), micro secure digital (Micro-SD), mini secure digital (Mini-SD), extreme digital (xD) or a memory stick. The external memory 1234 is functionally connected with the electronic device 1200 through various interfaces. According to various embodiments of the present disclosure, the electronic device 1200 further includes a storage device (or storage medium) such as a hard disk drive.

The sensor module 1240 measures a physical quantity or detects an operation state of the electronic device 1200, and converts the measured or detected information to an electric signal. The sensor module 1240 includes at least one of a gesture sensor 1240A, a gyro sensor 1240B, a pressure sensor 1240C, a magnetic sensor 1240D, an acceleration sensor 1240E, a grip sensor 1240F, a proximity sensor 1240G, a color sensor 1240H (e.g., red, green, blue (RGB) sensor), a living body sensor 1240I, a temperature/humidity sensor 1240J, an illuminance sensor 1240K, or an ultraviolet (UV) sensor 1240M. Although not illustrated, the sensor module 1240 further includes, for example, an E-nose sensor, an electromyography sensor (EMG) sensor, an electroencephalogram (EEG) sensor, an electrocardiogram (ECG) sensor, a photoplethysmographic (PPG) sensor, an infrared (IR) sensor, an iris sensor, a fingerprint sensor, and the like. The sensor module 1240 further includes a control circuit for controlling at least one or more sensors included therein.

The input device 1250 includes a touch panel 1252, a (digital) pen sensor 1254, a key 1256, or an ultrasonic input unit 1258. The touch panel 1252 recognizes a touch input using at least one of capacitive, resistive, infrared and ultrasonic detecting methods. Also, the touch panel 1252 further includes a control circuit. In the case of using the capacitive detecting method, a physical contact or proximity recognition is possible. The touch panel 1252 further includes a tactile layer. In this case, the touch panel 1252 provides a tactile reaction to a user.

The (digital) pen sensor 1254 is implemented in a similar or same manner as the method of receiving a touch input of a user or is implemented using an additional sheet for recognition. The key 1256 includes, for example, a physical button, an optical key, or a keypad. The ultrasonic input device 1258, which is an input device for generating an ultrasonic signal, enables the electronic device 1200 to sense detect a sound wave through a microphone (e.g., a microphone 1288) so as to identify data, wherein the ultrasonic input device 1258 is capable of wireless recognition.

According to various embodiments of the present disclosure, the electronic device 1200 uses the communication module 1220 so as to receive a user input from an external device (e.g., a computer or server) connected to the communication module 1220.

The display module 1260 includes a panel 1262, a hologram device 1264, or a projector 1266. The panel 1262 is a liquid-crystal display (LCD) or an active-matrix organic light-emitting diode (AMOLED). The panel 1264 is, for example, flexible, transparent or wearable. The panel 1264 and the touch panel 1252 are integrated into a single module. The hologram device 1264 displays a stereoscopic image in a space using a light interference phenomenon. The projector 1266 projects light onto a screen so as to display an image. The screen is arranged in the inside or the outside of the electronic device 1200. The display module 1260 further includes a control circuit for controlling the panel 1262, the hologram device 1264, or the projector 1266.

The interface 1270 includes, for example, a high-definition multimedia interface (HDMI) 1272, a universal serial bus (USB) 1274, an optical interface 1276, or a D-sub (D-subminiature) 1278. The interface 1270 includes, for example, a mobile high definition link (MHL) interface, a SD card/multi-media card (MMC) interface, or an infrared data association (IrDA) standard interface.

The audio module 1280 converts a sound and an electric signal in dual directions. The audio module 1280 processes, for example, sound information that is input or output through a speaker 1282, a receiver 1284, an earphone 1286, or a microphone 1288.

The camera module 1291 for shooting a still image or a video includes at least one image sensor (e.g., a front sensor or a rear sensor), a lens (not illustrated), an image signal processor (ISP, not illustrated), or a flash (e.g., an LED or a xenon lamp, not illustrated).

The power management module 1295 manages power of the electronic device 1200. Although not illustrated, the power management module 1295 includes, for example, a power management integrated circuit (PMIC) a charger IC, or a battery or fuel gauge.

The PMIC is mounted on an integrated circuit or a SoC semiconductor. A charging method is classified into a wired charging method and a wireless charging method. The charger IC charges a battery, and prevents an overvoltage or an overcurrent from being introduced from a charger. According to various embodiments of the present disclosure, the charger IC includes a charger IC for at least one of the wired charging method and the wireless charging method. The wireless charging method includes, for example, a magnetic resonance method, a magnetic induction method or an electromagnetic method, and includes an additional circuit, for example, a coil loop, a resonant circuit, or a rectifier, and the like.

The battery gauge measures, for example, a remaining capacity of the battery 1296 and a voltage, current or temperature thereof while the battery is charged. The battery 1296 stores or generates electricity, and supplies power to the electronic device 1200 using the stored or generated electricity. The battery 1296 includes, for example, a rechargeable battery or a solar battery.

The indicator 1297 displays a specific state of the electronic device 1200 or a part thereof (e.g., the AP 1210), such as a booting state, a message state, a charging state, and the like. The motor 1298 converts an electrical signal into a mechanical vibration. Although not illustrated, a processing device (e.g., a GPU) for supporting a mobile TV is included in the electronic device 1200. The processing device for supporting a mobile TV processes media data according to the standards of DMB, digital video broadcasting (DVB) or media flow.

Each of the above-mentioned elements of the electronic device according to various embodiments of the present disclosure may be configured with one or more components, and the names of the elements may be changed according to the type of the electronic device. The electronic device according to various embodiments of the present disclosure includes at least one of the above-mentioned elements, and some elements may be omitted or other additional elements may be added. Furthermore, some of the elements of the electronic device according to various embodiments of the present disclosure may be combined with each other so as to form one entity, so that the functions of the elements may be performed in the same manner as before the combination.

The term "module" used herein represents, for example, a unit including one or more combinations of hardware, software and firmware. The term "module" is interchangeably used with the terms "unit", "logic", "logical block", "component" and "circuit". The "module" is a minimum unit of an integrated component or is a part thereof. The "module" is a minimum unit for performing one or more functions or a part thereof. The "module" is implemented mechanically or electronically. For example, the "module" according to various embodiments of the present disclosure includes at least one of an application-specific IC (ASIC) chip, a field-programmable gate array (FPGA), and a programmable-logic device for performing some operations, which are known or will be developed.

According to various embodiments of the present disclosure, a biaxial hinge rotates a first hinge shaft and a second hinge shaft in cooperation therewith without using a gear.

According to various embodiments of the present disclosure, the biaxial hinge increases a distance between shafts without using a gear and increasing a thickness of a hinge.

According to various embodiments of the present disclosure, an electronic device including the biaxial hinge is free from limitation of a distance between shafts and may not be restricted by a design to be applied.

Although the present disclosure has been described with an exemplary embodiment, various changes and modifications may be suggested to one skilled in the art. It is intended that the present disclosure encompass such changes and modifications as fall within the scope of the appended claims.

What is claimed is:
1. A biaxial hinge comprising:
   a rotation cam part including a first rotation cam part and a second rotation cam part, the first rotation cam part being configured to rotate with a first hinge shaft as a first center and the second rotation cam part being configured to rotate with a second hinge shaft as a second center, wherein each of the first and second rotation cam parts include a plurality of pockets each of which comprises one side opened and inwardly recessed;
   a sliding cam part comprising one side protruding in a direction of the rotation cam part and an incline so as to move upward and downward in cooperation with rotation of the rotation cam part and insert in one of the plurality of pockets;
   a guide part including a through-hole, which is formed at a center portion of the guide part and which the one side protruding from the sliding cam part perforates to guide movement of the sliding cam part; and a support part configured to support the sliding cam part at a lower portion of the sliding cam part.

2. The biaxial hinge of claim 1, wherein the sliding cam part comprises:
a sliding cam body placed at a lower portion of the rotation cam part;
a first sliding cam inserted in a pocket formed at the first rotation cam part; and
a second sliding cam spaced apart from the first sliding cam in a transverse direction of the sliding cam body and inserted in a pocket formed at the second rotation cam part.

3. The biaxial hinge of claim 1, wherein the first rotation cam part comprises:
a first pocket formed at a position in which a first sliding cam is inserted when the first rotation cam part and the second rotation cam part rotate inwardly towards each other;
a second pocket spaced apart from the first pocket in a clockwise direction with the first hinge shaft as the first center for the clockwise direction, wherein an area of the second pocket is cut in a direction perpendicular to an axis direction of the first hinge shaft that is smaller than an area of the first pocket; and
a first incline part comprising an incline and protruding downward between the first pocket and the second pocket to allow the first pocket and the second pocket to be formed independently of each other.

4. The biaxial hinge of claim 3, wherein the second rotation cam part comprises:
a third pocket formed at a position corresponding to the position of the first pocket and in which a second sliding cam is inserted when the first rotation cam part and the second rotation cam part rotate inwardly towards each other;
a fourth pocket spaced apart from the third pocket in a counterclockwise direction with the second hinge shaft as the second center for the counterclockwise direction, wherein an area of the fourth pocket is cut in a direction perpendicular to an axis direction of the second hinge shaft that is wider than that of the third pocket; and
a second incline part comprising an incline and protruding downward between the third pocket and the fourth pocket to allow the third pocket and the fourth pocket to be formed independently of each other.

5. The biaxial hinge of claim 4, wherein the first incline part includes a first incline formed at one side of the first incline part and a first vertical surface formed at an other side of the first incline part in a direction of the first hinge shaft, and
wherein the second incline part includes a second incline formed at one side the second incline part and a second vertical surface formed at an other side of the second incline part in a direction of the second hinge shaft.

6. The biaxial hinge of claim 5, wherein the first incline and the second incline of the rotation cam part are inclined in a direction opposite to each other.

7. The biaxial hinge of claim 5, wherein the first sliding cam includes a third incline formed at one side of the first sliding cam in a direction corresponding to the first incline and a third vertical surface formed at an other side of the first sliding cam in a direction of the first hinge shaft, and
wherein the second sliding cam includes a fourth incline formed at one side of the second sliding cam in a direction corresponding to the second incline and a fourth vertical surface formed at an other side of the second sliding cam in a direction of the second hinge shaft.

8. The biaxial hinge of claim 7, wherein the third incline and the fourth incline are inclined in a direction opposite to each other.

9. The biaxial hinge of claim 4, wherein the first pocket and the fourth pocket are provided in a same shape and the second pocket and the third pocket are provided in a same shape.

10. The biaxial hinge of claim 1, wherein the first hinge shaft inserted in the first rotation cam part and the second hinge shaft inserted in the second rotation cam part are spaced apart from each other by a constant distance to allow end portions of the first and second rotation cam parts not to contact each other while rotating.

11. The biaxial hinge of claim 1, wherein the guide part further comprises:
a holding part protruding from one side of a guide body configured to restrict movement of the rotation cam part, and
wherein the rotation cam part further comprises:
a protrusion part protruding in a direction of the holding part such that movement of the rotation cam part is restricted by the holding part at rotation.

12. The biaxial hinge of claim 1, wherein the support part comprises:
an elastic member between the sliding cam part and a lower plate placed under the sliding cam part configured to provide an elastic force to the sliding cam part.

13. The biaxial hinge of claim 12, wherein the support part further comprises:
a support shaft inserted in the elastic member and including one side fixed to the sliding cam part or the lower plate and an other side perforating the lower plate or the sliding cam part is not fastened.

14. The biaxial hinge of claim 1, further comprising:
a second cam part at a lower portion of the sliding cam part, and
wherein the second cam part comprises:
a rotation cam coupled to a hinge shaft and configured to rotate with the hinge shaft;
a third sliding cam configured to move upward and downward through sliding according to rotation of the rotation cam with the third sliding cam perforated by the hinge shaft, and
an elastic part configured to provide a restoring force to the third sliding cam.

15. The biaxial hinge of claim 14, wherein the third sliding cam is a lower plate.

16. An electronic device comprising:
a first housing;
a second housing facing the first housing; and
a biaxial hinge configured to connect the first housing and the second housing, wherein the biaxial hinge comprises:
a rotation cam part including a first rotation cam part and a second rotation cam part, the first rotation cam part being configured to rotate with a first hinge shaft as a first center and the second rotation cam part being configured to rotate with a second hinge shaft as a second center, wherein each of the first and second rotation cam parts include a plurality of pockets each of which comprises one side opened and inwardly recessed;
a sliding cam part comprising one side protruding in a direction of the rotation cam part with an incline so as to move upward and downward in cooperation with rotation of the rotation cam part and insert in one of the plurality of pockets;

a guide part including a through-hole, which is formed at a center portion of the guide part and which one side of the sliding cam part perforates to guide movement of the sliding cam part; and a support part configured to support the sliding cam part at a lower portion of the sliding cam part.

17. The electronic device of claim 16, wherein the first rotation cam part and the second rotation cam part comprise rotation bodies in which the hinge shafts are inserted and each of which includes a pocket formed at a lower portion of the hinge shaft and connection bodies configured to extend from the rotation bodies, respectively; and wherein the first housing is coupled to the connection body of the first rotation cam part at both side ends of the first rotation cam part and the second housing is coupled to the connection body of the second rotation cam part at both side ends the second rotation cam part.

18. The electronic device of claim 16, wherein the sliding cam part comprises:

a sliding cam body placed at a lower portion of the rotation cam part;

a first sliding cam inserted in a pocket formed at the first rotation cam part; and a second sliding cam spaced apart from the first sliding cam in a transverse direction of the sliding cam body and inserted in a pocket formed at the second rotation cam part.

19. The electronic device of claim 16, wherein the first rotation cam part comprises:

a first pocket formed at a position in which a first sliding cam is inserted when the first rotation cam part and the second rotation cam part rotate inwardly towards each other;

a second pocket spaced apart from the first pocket in a clockwise direction with a first hinge shaft as the first center for the clockwise direction, wherein an area of the second pocket is cut in a direction perpendicular to an axis direction of the first hinge shaft that is smaller than an area of the first pocket; and a first incline part comprising an incline and protruding downward between the first pocket and the second pocket to allow the first pocket and the second pocket to be formed independently of each other.

20. The electronic device of claim 16, wherein the second rotation cam part comprises:

a third pocket formed at a position corresponding to the position of a first pocket and in which a second sliding cam is inserted when the first rotation cam part and the second rotation cam part rotate inwardly towards each other;

a fourth pocket spaced apart from the third pocket in a counterclockwise direction with the second hinge shaft as the second center for the counterclockwise direction, wherein an area of the fourth pocket is cut in a direction perpendicular to an axis direction of the second hinge shaft that is wider than that of the third pocket; and a second incline part comprising an incline and protruding downward between the third pocket and the fourth pocket to allow the third pocket and the fourth pocket to be formed independently of each other.

* * * * *